(12) United States Patent
Shikama

(10) Patent No.: US 11,696,031 B1
(45) Date of Patent: Jul. 4, 2023

(54) DRIVE MECHANISM, CAMERA DEVICE AND PORTABLE ELECTRIC DEVICE

(71) Applicant: AAC Optics (Nanning) Co., Ltd., Nanning (CN)

(72) Inventor: Kazuo Shikama, Osaka (JP)

(73) Assignee: AAC Optics (Nanning) Co., Ltd., Nanning (CN)

( * ) Notice: Subject to any disclaimer, the term of this patent is extended or adjusted under 35 U.S.C. 154(b) by 0 days.

(21) Appl. No.: 17/732,520

(22) Filed: Apr. 29, 2022

(30) Foreign Application Priority Data

Mar. 31, 2022 (JP) .................................. 2022-059566

(51) Int. Cl.
| | | |
|---|---|---|
| H04N 23/68 | (2023.01) | |
| H04N 23/55 | (2023.01) | |
| H04N 23/67 | (2023.01) | |
| G03B 13/36 | (2021.01) | |
| G03B 30/00 | (2021.01) | |
| G02B 13/00 | (2006.01) | |

(52) U.S. Cl.
CPC ........... *H04N 23/687* (2023.01); *G03B 13/36* (2013.01); *G03B 30/00* (2021.01); *H04N 23/55* (2023.01); *H04N 23/67* (2023.01); *G02B 13/001* (2013.01)

(58) Field of Classification Search
CPC ...... H04N 23/687; H04N 23/55; H04N 23/67; G03B 13/36; G03B 30/00; G02B 13/001
See application file for complete search history.

(56) References Cited

U.S. PATENT DOCUMENTS

| | | | | |
|---|---|---|---|---|
| 2014/0355120 | A1* | 12/2014 | Yeo ...................... | G02B 13/001 |
| | | | | 359/557 |
| 2016/0025995 | A1* | 1/2016 | Ariji ........................ | G03B 5/02 |
| | | | | 359/557 |
| 2018/0059381 | A1* | 3/2018 | Sharma .................... | G02B 7/08 |
| 2018/0239217 | A1* | 8/2018 | Konuma .................. | G02B 7/04 |
| 2018/0321459 | A1* | 11/2018 | Kim ...................... | H04N 23/685 |
| 2019/0094565 | A1* | 3/2019 | Park ..................... | G02B 13/001 |

* cited by examiner

*Primary Examiner* — Shahbaz Nazrul
(74) *Attorney, Agent, or Firm* — W&G Law Group

(57) ABSTRACT

A drive mechanism, a camera device and a portable electric device are provided. The drive mechanism includes an auto-focusing mechanism and a stabilization mechanism. The auto-focusing mechanism receive and drive the lens along an optical axis of the lens. The auto-focusing mechanism includes a stator and a mover. The mover includes a holder for installing the lens. A groove is formed at a surface of the holder facing the stator. An inner side of the groove is coated with a vibration damping gel. The stator is provided with a claw member extending into the groove to cooperate with the vibration damping gel. The stator is further provided with a through-hole opposite to the groove to expose the groove. After assembling is completed, an amount of the vibration damping gel can be adjusted through the groove, thereby suppressing vibration of the auto-focusing mechanism and improving the vibration damping effect.

10 Claims, 11 Drawing Sheets

DRIVE MECHANISM, CAMERA DEVICE AND PORTABLE ELECTRIC DEVICE

TECHNICAL FIELD

The present invention relates to the technical field of camera devices, in particular to a drive mechanism, a camera device and a portable electric device.

BACKGROUND

With the rapid development of camera technology, camera devices including lens drives are widely used in many camera devices. It has been widely accepted by consumers to apply a camera device including a lens drive to various portable electric devices such as portable phones and tablet computers.

A drive mechanism applied to a lens driving device of a portable electric device usually includes an auto-focusing mechanism for adjusting the focus in a direction of the optical axis, and a stabilization mechanism for driving the lens in a plane orthogonal to the direction of the optical axis.

For the drive mechanism of the prior art, the mover of the auto-focusing mechanism carries the lens and performs, along with the lens, an auto-focusing motion along the direction of the optical axis and a stabilization motion along a plane perpendicular to the optical axis. In order to suppress the unnecessary vibration during the auto-focusing process, a vibration damping gel for auto-focusing can be applied between the mover and the stator of the auto-focusing mechanism. However, in order to avoid an influence on the stabilization motion, the vibration damping gel for auto-focusing usually cannot be applied between the mover of the auto-focusing mechanism and the case of the drive mechanism, but can only be applied inside the auto-focusing mechanism. As a result, an amount of the vibration damping gel for auto-focusing can be determined only during the assembly process of the drive mechanism, and the amount of the vibration damping gel for auto-focusing cannot be adjusted when detecting the auto-focusing drive sensitivity after overall assembling of the drive mechanism is completed.

Therefore, a new drive mechanism needs to be provided to solve the above problems.

SUMMARY

The present invention is intended to provide a drive mechanism, a camera device and a portable electric device, which can adjust an amount of the vibration damping gel for auto-focusing after assembling of the drive mechanism is completed.

In a first aspect, an embodiment of the present invention provides a drive mechanism, including: an auto-focusing mechanism that receives a lens and drives the lens along a direction of an optical axis of the lens, the auto-focusing mechanism including a stator for auto-focusing and a mover for auto-focusing that is movable relative to the stator for auto-focusing, and the mover for auto-focusing including a holder for auto-focusing configured to install the lens; and a stabilization mechanism that receives a camera element assembly and drives the camera element assembly in a plane perpendicular to the direction of the optical axis of the lens, the stabilization mechanism and the auto-focusing mechanism being arranged along the direction of the optical axis of the lens. The stabilization mechanism includes a stator for the stabilization mechanism and a mover for the stabilization mechanism that is movable relative to the stator for the stabilization mechanism and located at a side of the stator for the stabilization mechanism close to the auto-focusing mechanism, the mover for the stabilization mechanism includes a movable frame for the stabilization mechanism spaced from the mover for auto-focusing, and the movable frame for the stabilization mechanism is configured to install the camera element assembly. At least one groove is formed at a surface of the holder for auto-focusing facing the stator for auto-focusing, an inner side of the at least one groove is coated with a vibration damping gel for auto-focusing, the stator for auto-focusing is provided with at least one claw member extending into the at least one groove to cooperate with the vibration damping gel for auto-focusing, and the stator for auto-focusing is further provided with is at least one through-hole opposite to the at least one groove to expose the at least one groove.

In an improved embodiment, the at least one groove includes a plurality of grooves spaced from each other, and the at least one claw member includes a plurality of claw members corresponding to the plurality of grooves.

In an improved embodiment, the surface of the holder for auto-focusing where the plurality of groove is formed is perpendicular to the optical axis of the lens, and at least part of each of the plurality of claw members extends along the direction of the optical axis of the lens.

In an improved embodiment, each of the plurality of claw members includes a root of the claw member connected to a hole wall of one of the at least one through-hole and a pin of the claw member extending from the root of the claw member, the root of the claw member ha an arc shape, and the pin of the claw member has a flat plate shape extending along the direction of the optical axis of the lens.

In an improved embodiment, the stator for auto-focusing includes a case for auto-focusing, and the stator for the stabilization mechanism includes a case for the stabilization mechanism. The case for auto-focusing and the case for the stabilization mechanism cover each other to form a receiving space, and the mover for auto-focusing and the mover for the stabilization mechanism are received in the receiving space.

In an improved embodiment, the case for auto-focusing includes a top wall perpendicular to the optical axis of the lens and a light-transmitting hole formed at the top wall, and the at least one through-hole is formed at the top wall and communicated with the light-transmitting hole.

In an improved embodiment, the top wall of the case for auto-focusing has a quadrangle shape, and the plurality of claw members is arranged at four corners of the top wall.

In an improved embodiment, a first vibration damping gel for the stabilization mechanism is provided between the stator for the stabilization mechanism and the mover for the stabilization mechanism; and a second vibration damping gel for the stabilization mechanism is provided between the mover for the stabilization mechanism and the stator for auto-focusing.

In a second aspect, an embodiment of the present invention provides a camera device, including the drive mechanism described above; and a lens and a camera element assembly that are received in the drive mechanism. The camera element assembly includes: a filter and a circuit board that is equipped with an image sensor, the movable frame for the stabilization mechanism of the drive mechanism includes a main body for installing the filter and a cantilever extending vertically from the main body, and the circuit board is fixed to the cantilever.

In a third aspect, an embodiment of the present invention provides a portable electric device including the camera device described above.

The present invention has the following beneficial effects. The mover for auto-focusing and the mover for the stabilization mechanism are independent from each other. By providing the vibration damping gel for auto-focusing between the mover for auto-focusing and the stator for auto-focusing, it is possible to suppress the vibration in the direction of the optical axis without affecting the movement of the mover for the stabilization mechanism. At the same time, the stator for auto-focusing is provided with a through-hole for exposing the groove that receives the vibration damping gel for auto-focusing, thus after overall assembling of the drive mechanism is completed, the vibration damping gel for auto-focusing can be further added into or taken away from the groove via the through-hole, so as to achieve adjustment of the vibration damping gel for auto-focusing, thereby improving a vibration damping effect of the auto-focusing mechanism.

It should understood that the foregoing general description and the following detailed description are exemplary only and do not limit the present invention.

REFERENCE NUMERALS

Figure 1:
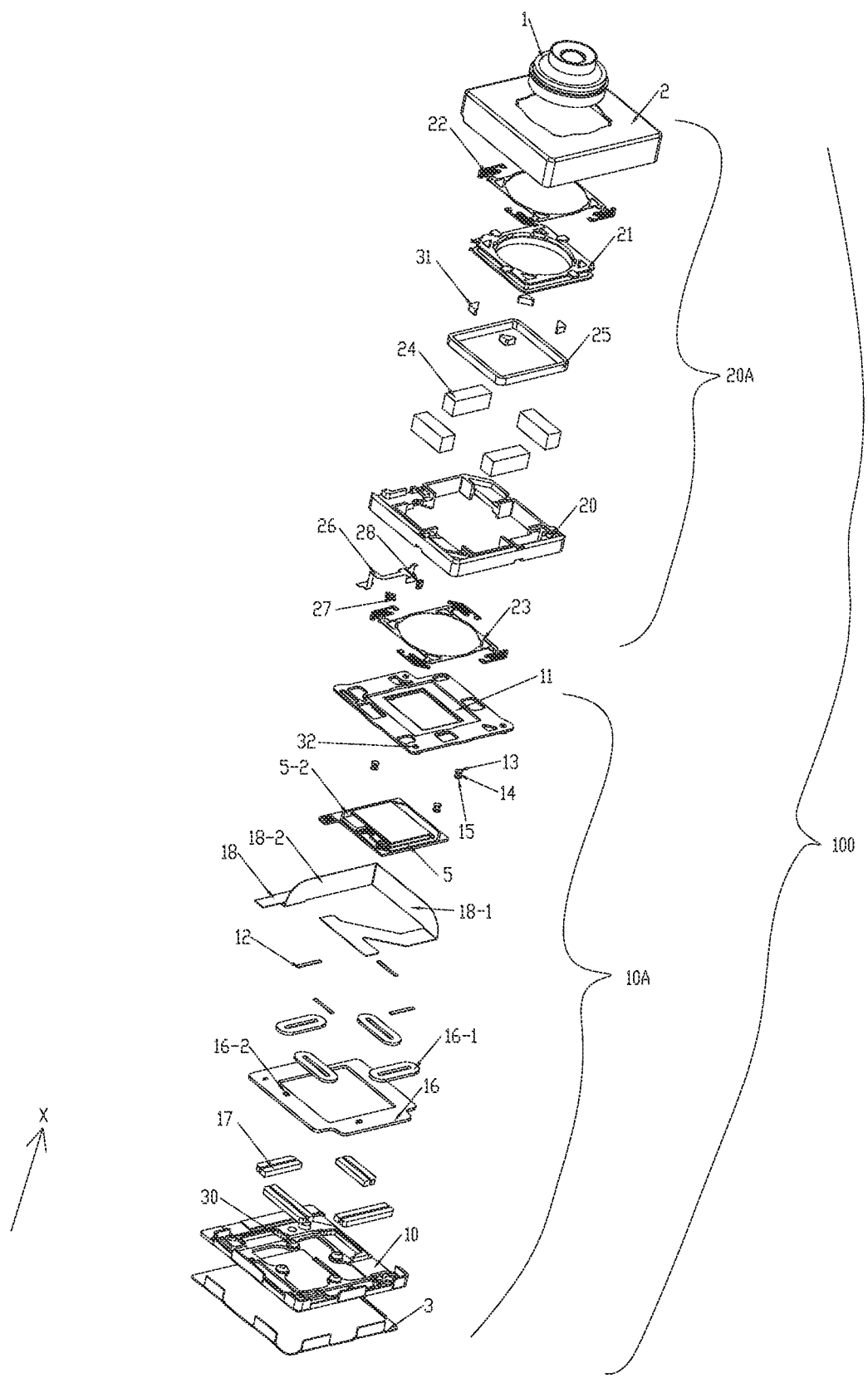
FIG. 1 is an exploded view of a drive mechanism according to an embodiment of the present invention.

1—lens;
2—case for auto-focusing;
  2-1—top wall;
    2-1-1—through-hole;
    2-1-2—light-transmitting hole;
3—case for a stabilization mechanism;
4—claw member;
  4-1—root of the claw member;
  4-2—pin of the claw member;
5—camera element assembly;
  5-1—filter;
  5-2—circuit board;
  5-3—image sensor;
10A—stabilization mechanism;
10—base for the stabilization mechanism;
11—movable frame for the stabilization mechanism;
  11-1—main body;
  11-2—cantilever;
12—yoke for the stabilization mechanism;
13—support plate of support member for the stabilization mechanism (for the movable frame);
14—support member for the stabilization mechanism;
15—support plate of support member for the stabilization mechanism (for the base);
16—circuit board for the stabilization mechanism;
  16-1—coil for the stabilization mechanism;
  16-2—position detection component for the stabilization mechanism;
17—magnet for the stabilization mechanism;
18—flexible substrate for the stabilization mechanism;
  18-1—curved surface A of the flexible substrate for the stabilization mechanism;
  18-2—curved surface B of the flexible substrate for the stabilization mechanism;
20A—auto-focusing mechanism;
20—base for auto-focusing;
21—holder for auto-focusing;
  21-1—groove;
22—upper leaf spring for auto-focusing;
23—lower leaf spring for auto-focusing;
24—magnet for auto-focusing;
25—coil for auto-focusing;
26—power-on flexible substrate for auto-focusing;
27—position detection component for auto-focusing;
28—position detection magnet for auto-focusing;
30—first vibration damping gel for the stabilization mechanism;
31—vibration damping gel for auto-focusing;
32—second vibration damping gel for the stabilization mechanism;
100—camera device;
200—portable electric device;
X—direction of optical axis.

The drawings herein are incorporated into and constitute a part of the present specification, illustrate embodiments of the present invention and explain principles of the present invention together with the specification.

DETAILED DESCRIPTION OF EMBODIMENTS

Embodiments of the present invention will be described in detail as follows with reference to the accompanying drawings.

The terms used in the embodiments of the present invention are merely for the purpose of describing particular embodiments but not intended to limit the present invention. Unless otherwise noted in the context, the singular form expressions "a", "an", "the" and "said" used in the embodiments and appended claims of the present invention are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

It should be understood that, the terms such as "upper", "lower", "left", "right" and the like are used to indicate positions shown in the drawing, instead of being construed as limitations of the embodiment of the present invention. In addition, when an element is described as being "on" or "under" another element in the context, it should be understood that the element can be directly or via an intermediate element located "on" or "under" another element.

As shown in FIG. 1 to FIG. 10, an embodiment of the present invention provides a drive mechanism, including an auto-focusing mechanism 20A and a stabilization mechanism 10A. The auto-focusing mechanism 20A can receive a lens 1 and drive the lens 1 along a direction X of an optical axis of the lens 1. The stabilization mechanism 10A can receive a camera element assembly 5 and drive the camera element assembly 5 in a plane perpendicular to the direction X of the optical axis of the lens 1. The stabilization mechanism 10A and the auto-focusing mechanism 20A are arranged along the direction X of the optical axis of the lens 1.

The auto-focusing mechanism 20A includes a stator for auto-focusing and a mover for auto-focusing that can move relative to the stator for auto-focusing. The stabilization mechanism 10A includes a stator for the stabilization mechanism and a mover for the stabilization mechanism that can move relative to the stator for the stabilization mechanism.

The stator for auto-focusing includes a case 2 for auto-focusing. The stator for the stabilization mechanism includes a case 3 for the stabilization mechanism. The case 2 for auto-focusing and the case 3 for the stabilization mechanism are located at two ends of the drive mechanism, and cover each other to form a receiving space. Both the mover for auto-focusing and the mover for the stabilization mechanism are received in the receiving space.

The mover for auto-focusing includes a holder 21 for auto-focusing configured to install the lens 1. The holder 21 for auto-focusing can drive the lens 1 to move along the direction X of the optical axis to achieve focus adjustment. The mover for the stabilization mechanism includes a movable frame 11 for the stabilization mechanism configured to install the camera element assembly 5. The movable frame 11 for the stabilization mechanism can drive the camera element assembly 5 to move in a plane perpendicular to the direction X of the optical axis to achieve optical stabilization. The holder 21 for auto-focusing and the movable frame 11 for the stabilization mechanism are spaced from each other in the direction X of the optical axis. Therefore, in this embodiment, the mover for auto-focusing and the mover for the stabilization mechanism can move independently without interfering with each other.

In this embodiment, a groove 21-1 is formed at a surface of the holder 21 for auto-focusing facing the stator for auto-focusing. An inner side of the groove 21-1 is coated with a vibration damping gel 31 for auto-focusing. The stator for auto-focusing is provided with a claw member 4 extending towards the groove 21-1. The claw member 4 can extend into the groove 21-1 and cooperate with the vibration damping gel 31 for auto-focusing to generate damping for suppressing the vibration in the direction X of the optical axis.

In this embodiment, the stator for auto-focusing is further provided with a through-hole 2-1-1 opposite to the groove 21-1, such that the groove 21-1 is exposed, that is, the groove 21-1 can be touched from the outside of the stator for auto-focusing. After overall assembling of the drive mechanism is completed, the vibration damping gel 31 for auto-focusing can be further added into or taken away from the groove 21-1 via the through-hole 2-1-1, so as to achieve adjustment of the vibration damping gel 31 for auto-focusing, thereby adjusting a vibration damping effect of the auto-focusing mechanism 20A.

In this embodiment, the stator for auto-focusing further includes a base 20 for auto-focusing and a magnet 24 for auto-focusing. The mover for auto-focusing includes at least a holder 21 for auto-focusing and a coil 25 for auto-focusing. The lens 1 and the coil 25 for auto-focusing are both connected to the holder 21 for auto-focusing. The lens 1 is fixed to a circular hole at a center of the holder 21 for auto-focusing. The coil 25 for auto-focusing is sleeved on an external wall surface of the holder 21 for auto-focusing. The base 20 for auto-focusing is a frame structure arranged at the outside of the holder 21 for auto-focusing. The magnet 24 for auto-focusing is fixed to an inner wall surface of the base 20 for auto-focusing. The magnet 24 for auto-focusing and the coil 25 for auto-focusing are opposite to and spaced from each other.

When the auto-focusing mechanism 20A performs auto-focusing, the coil 25 for auto-focusing is energized. With an interaction between the magnetic field of the magnet 24 for auto-focusing and the current flowing through the coil 25 for auto-focusing, a driving force that can drive the mover for auto-focusing to move relative to the stator for auto-focusing along the direction X of the optical axis of the lens 1 can be generated, thereby driving the lens 1 that is fixed to the holder 21 for auto-focusing to move. By controlling a direction and a magnitude of the current flowing into the coil 25 for auto-focusing, a position of the lens 1 can be adjusted to achieve focus adjustment.

Further, as shown in the embodiment of FIG. 1, the auto-focusing mechanism 20A further includes a power-on flexible substrate 26 for auto-focusing, a position detection component 27 for auto-focusing and a position detection magnet 28 for auto-focusing. The position detection magnet 28 for auto-focusing is arranged at the holder 21 for auto-focusing. The power-on flexible substrate 26 for auto-focusing is equipped with the position detection component 27 for auto-focusing, then, the magnetic flux of the position detection magnet 28 for auto-focusing that moves along the direction X of the optical axis of the lens 1 can be detected, thereby performing accurate position detection and auto-focusing control.

The auto-focusing mechanism 20A further includes an upper leaf spring 22 for auto-focusing and a lower leaf spring 23 for auto-focusing. Two ends of the holder 21 for auto-focusing are connected to the upper leaf spring 22 for auto-focusing and the lower leaf spring 23 for auto-focusing. Both the upper leaf spring 22 for auto-focusing and the lower leaf spring 23 for auto-focusing have elasticity, which can keep the lens 1 in a suspended state without applying an electromagnetic force.

During a working process of the drive mechanism, the elasticity of the upper leaf spring 22 for auto-focusing and the lower leaf spring 23 for auto-focusing will cause the auto-focusing mechanism 20A to generate an vibration effect in the direction X of the optical axis of the lens 1 that affects the focusing effect. However, since a vibration damping gel 31 for auto-focusing is provided between the holder 21 for auto-focusing and the stator for auto-focusing, the vibration can be suppressed.

In an embodiment, as shown in FIG. 2 and FIG. 4 to FIG. 7, a groove 21-1 is formed at a surface of the holder 21 for auto-focusing facing the stator for auto-focusing. This surface is perpendicular to the direction X of the optical axis of the lens 1. The vibration damping gel 31 for auto-focusing is provided in the groove 21-1. The stator for auto-focusing is provided with a through-hole 2-1-1 corresponding to the groove 21-1. The through-hole 2-1-1 can connect the groove 21-1 to the outside. At least part of the claw member 4 extends to an interior of the groove 21-1 along the direction X of the optical axis of the lens 1 via the through-hole 2-1-1, to cooperate with the vibration damping gel 31 for auto-focusing to generate a damping effect.

Figure 4:
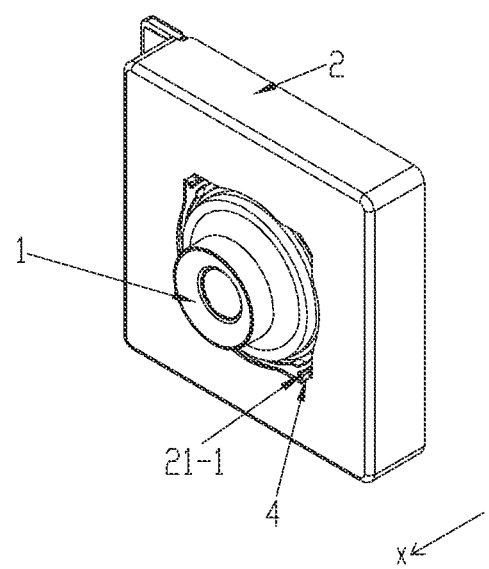
FIG. 4 is a schematic diagram illustrating a structure of FIG. 2 in another viewing angle.
Figure 5:
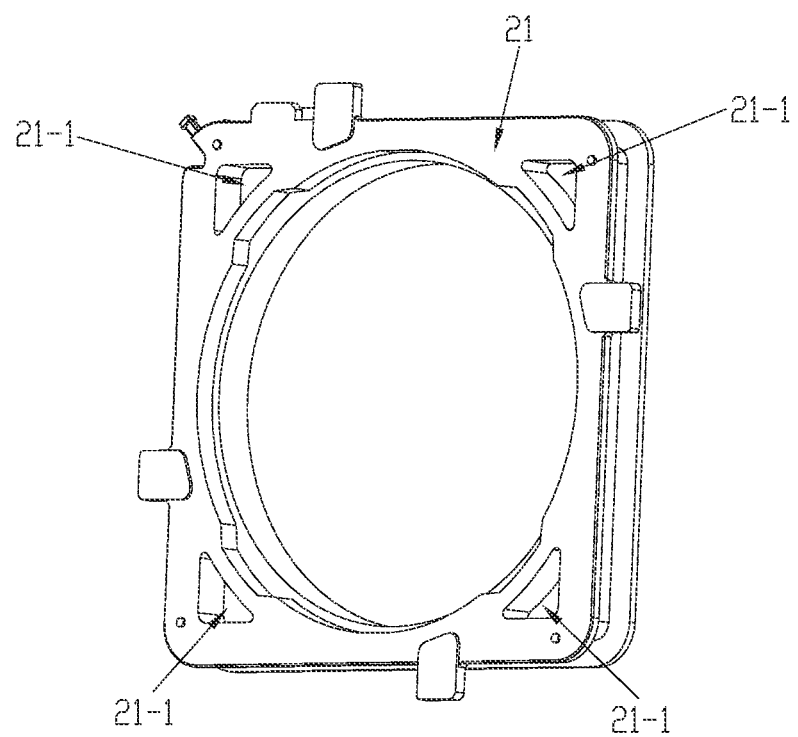
FIG. 5 is a schematic diagram illustrating a structure of a holder for auto-focusing shown in FIG. 1.

As shown in the embodiment of FIG. 4, the holder 21 for auto-focusing is provided with grooves 21-1 spaced from each other. Correspondingly, the stator for auto-focusing is provided with through-holes 2-1-1 and claw members 4 corresponding to the grooves 21-1, such that the stabilization of the auto-focusing mechanism 20A is further improved.

Figure 6:
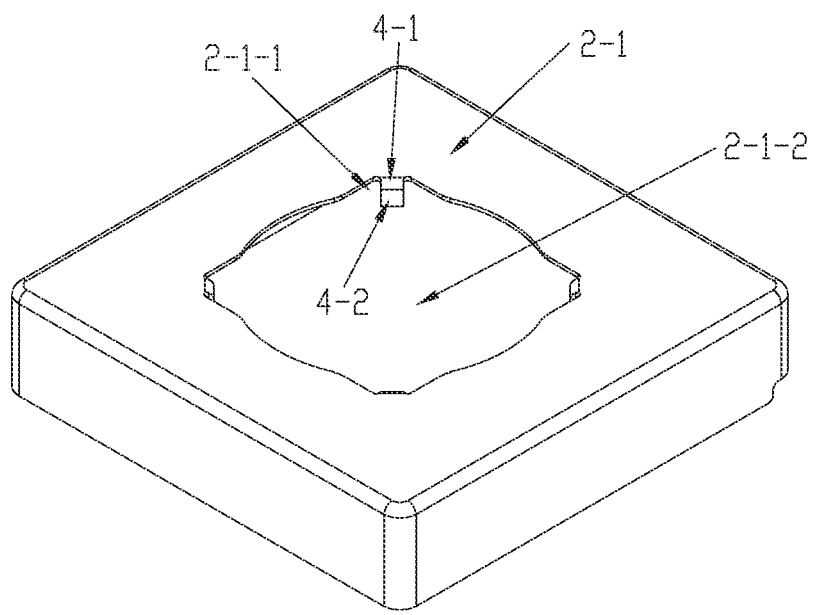
FIG. 6 is a schematic diagram illustrating a structure of a case for auto-focusing shown in FIG. 1.

In an embodiment, as shown in FIG. 6, the claw member 4 includes a root 4-1 of the claw member connected to a hole wall of the through-hole 2-1-1 and a pin 4-2 of the claw member extending from the root 4-1 of the claw member. The root 4-1 of the claw member has an arc shape. The pin 4-2 of the claw member has a flat plate shape extending along the direction X of the optical axis of the lens 1. In this embodiment, the claw member 4 has a simple structure and is easy to manufacture.

Figure 7:
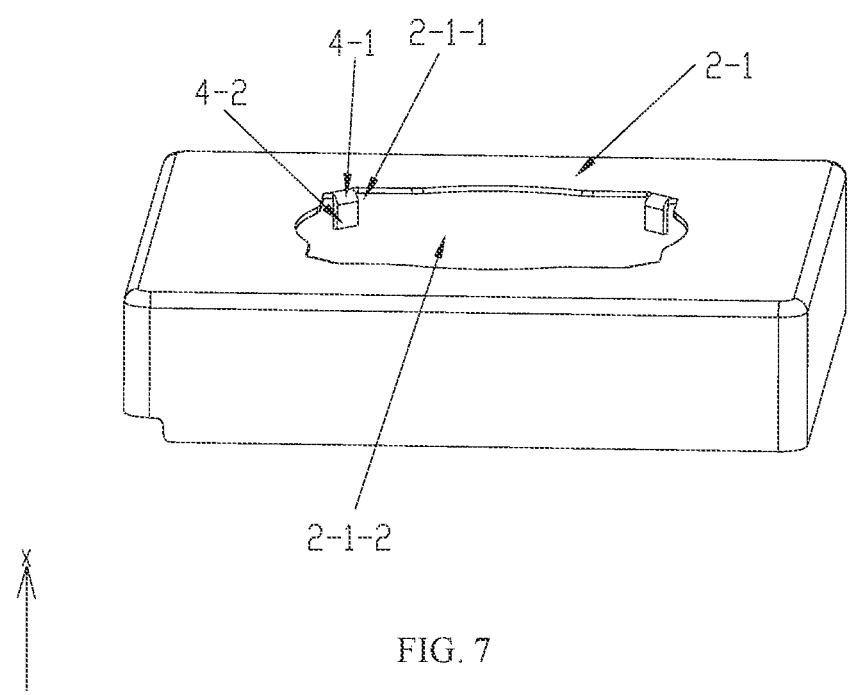
FIG. 7 is a schematic diagram illustrating a structure of FIG. 6 in another viewing angle.

In an embodiment, as shown in FIG. 6 and FIG. 7, the case 2 for auto-focusing includes a top wall 2-1 perpendicular to the direction X of the optical axis of the lens 1 and a light-transmitting hole 2-1-2 formed at the top wall 2-1. The through-hole 2-1-1 is formed at the top wall 2-1 and communicated with the light-transmitting hole 2-1-2.

In this embodiment, the light-transmitting hole 2-1-2 is located at a middle position of the case 2 for auto-focusing, and is used for receiving the lens 1. Light enters the lens 1 through the light-transmitting hole 2-1-2. When the auto-focusing mechanism 20A performs auto-focusing, the holder 21 for auto-focusing can drive the lens 1 to move in the light-transmitting hole 2-1-2 along the direction X of the optical axis of the lens 1. The through-hole 2-1-1 is communicated with the light-transmitting hole 2-1-2, thereby simplifying a structure of the case 2 for auto-focusing.

Figure 2:
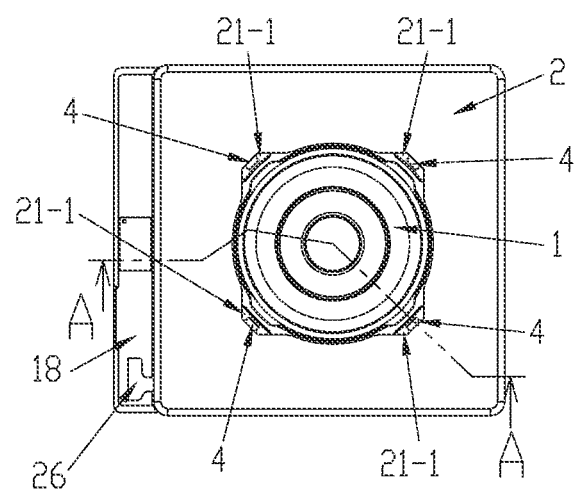
FIG. 2 is a top view of a drive mechanism according to an embodiment of the present invention.
Figure 3:
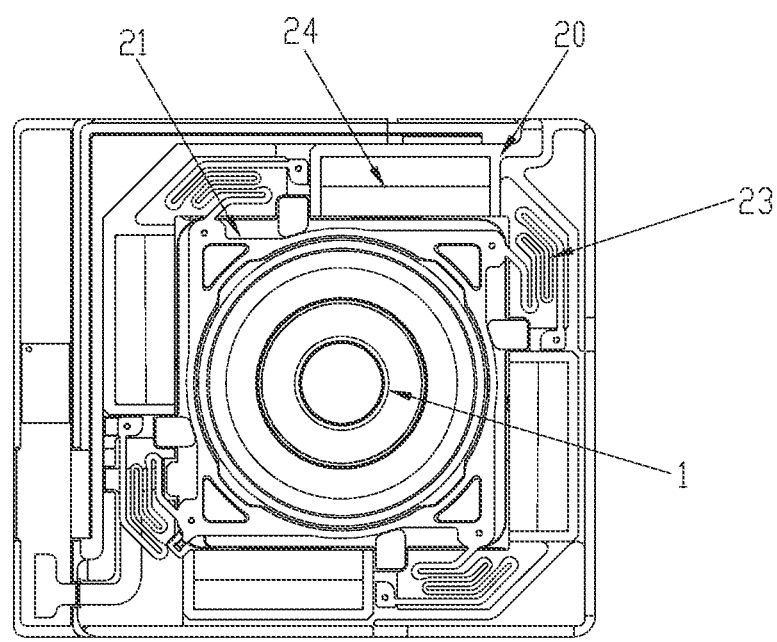
FIG. 3 is a schematic diagram illustrating an internal structure of FIG. 2.

As shown in FIG. 2, a top wall 2-1 of the case 2 for auto-focusing has a quadrilateral shape, and the claw members 4 are located at four corners of the top wall 2-1, thereby maintaining a force balance of the auto-focusing mechanism 20A during the movement.

In an embodiment, the stator for the stabilization mechanism further includes a base 10 for the stabilization mechanism and a magnet 17 for the stabilization mechanism. The mover for the stabilization mechanism further includes a circuit board 16 for the stabilization mechanism and a coil 16-1 for the stabilization mechanism embedded into the circuit board 16 for the stabilization mechanism. The magnet 17 for the stabilization mechanism is fixed to the base 10 for the stabilization mechanism. The circuit board 16 for the stabilization mechanism and the camera element assembly 5 are fixed to the movable frame 11 for the stabilization mechanism. The coil 16-1 for the stabilization mechanism and the magnet 17 for the stabilization mechanism are opposite to and spaced from each other in the direction X of the optical axis of the lens 1.

The coil 16-1 for the stabilization mechanism is energized when the stabilization mechanism 10A performs hand-shake correction. Through an interaction between the magnetic field of the magnet 17 for the stabilization mechanism and a current flowing through the coil 16-1 for the stabilization mechanism, the movable frame 11 for the stabilization mechanism is driven to move on a plane orthogonal to the direction X of the optical axis of the lens 1, thereby achieving hand-shake correction. By controlling a direction and a magnitude of the current flowing into the coil 16-1 for the stabilization mechanism, an angle and an amplitude of the movement of the movable frame 11 for the stabilization mechanism can be controlled, thereby achieving the stabilization effect of the drive mechanism.

Figure 8:
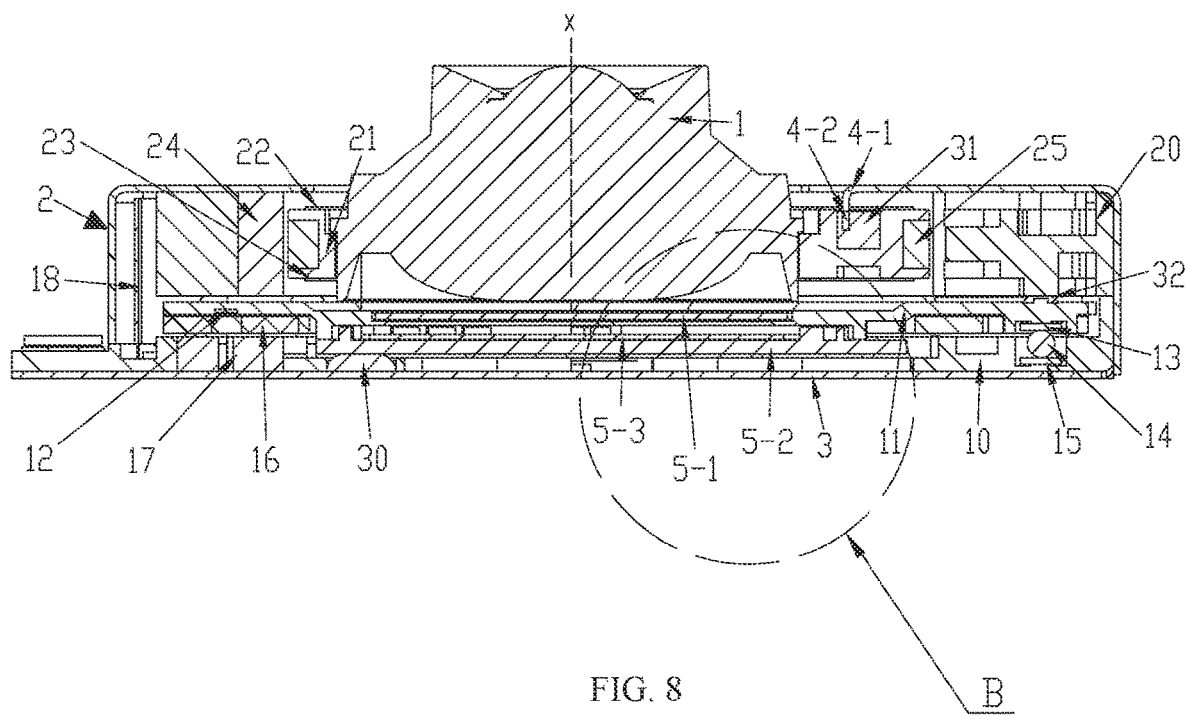
FIG. 8 is a cross-sectional view along A-A shown in FIG. 2.
Figure 9:
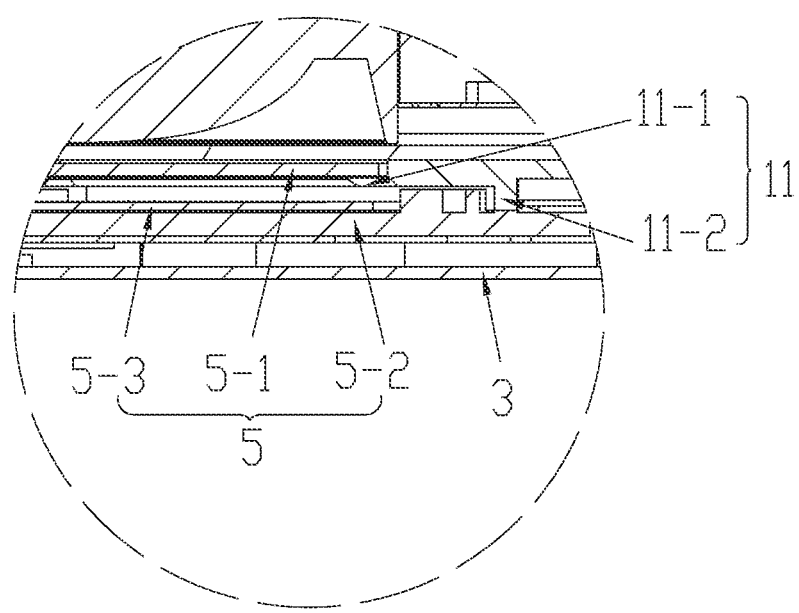
FIG. 9 is an enlarged view of a part B shown in FIG. 8.

In an embodiment, as shown in FIG. 1, FIG. 8 and FIG. 9, the camera element assembly 5 includes a filter 5-1 and a circuit board 5-2 that is equipped with an image sensor 5-3. The movable frame 11 for the stabilization mechanism includes a main body 11-1 for installing the filter 5-1 and a cantilever 11-2 extending vertically from the main body. The circuit board 5-2 is fixed to the cantilever 11-2.

The filter 5-1 is configured to block infrared rays having harmful wavelengths to protect the image sensor 5-3. The filter 5-1 and the circuit board 5-2 that is equipped with the image sensor 5-3 are installed to the movable frame 11 for the stabilization mechanism. In this way, the components in the stabilization mechanism 10A can be reduced, thereby facilitating the miniaturization of the stabilization mechanism 10A. Besides, the verticality of the image sensor 5-3 with respect to the direction X of the optical axis of the lens 1 can be improved, thereby reducing a possibility of deviation during the installation process.

As shown in FIG. 1, the mover for the stabilization mechanism further includes a yoke 12 for the stabilization mechanism arranged at the movable frame 11 for the stabilization mechanism. The yoke 12 for the stabilization mechanism is disposed at a side of the coil 16-1 for the stabilization mechanism close to the auto-focusing mechanism 20A. The yoke 12 can cooperate with the magnet 17 for the stabilization mechanism to make the movable frame 11 for the stabilization mechanism move always on a plane orthogonal to the direction X of the optical axis of the lens 1, thereby reducing the tilt of the camera element assembly 5 relative to the optical axis. In the present invention, the yoke 12 for the stabilization mechanism can also reduce the magnetic flux leakage, so as to increase the magnetic flux passing through the coil 16-1 for the stabilization mechanism, thereby improving the driving force.

In an embodiment, the circuit board 16 for the stabilization mechanism is provided with at least two position detection components 16-2 for the stabilization mechanism. By detecting the magnetic flux of the fixed magnet 17 for the stabilization mechanism, correct position detection and stabilization control can be performed.

In an embodiment, as shown in FIG. 1, the stabilization mechanism 10A further includes a support plate (for the movable frame) 13 of the support member for the stabilization mechanism and a support plate (for the base) 15 of the support member for the stabilization mechanism. Along the direction X of the optical axis of the lens 1, a support member 14 for the stabilization mechanism is provided between the support plate (for the movable frame) 13 of the support member for the stabilization mechanism and the support plate (for the base) 15 of the support member for the stabilization mechanism. The support member 14 for the stabilization mechanism may have a sphere shape, which can reduce the resistance between the movable frame 11 for the stabilization mechanism and the base 10 for the stabilization mechanism during the movement, thereby reducing a force required to drive the movable frame 11 for the stabilization mechanism, so that the movement of the movable frame 11 for the stabilization mechanism can be smoother. By adjusting the surface precision of the support plate (for the movable frame) 13 of the support member for the stabilization mechanism and the support plate (for the base) 15 of the support member for the stabilization mechanism, there is less friction between the support member 14 for the stabilization mechanism and the support plate (for the movable frame) 13 of the support member for the stabilization mechanism and the support plate (for the base) 15 of the support member for the stabilization mechanism. In this way, the support member 14 for the stabilization mechanism can slide more smoothly.

Figure 10:
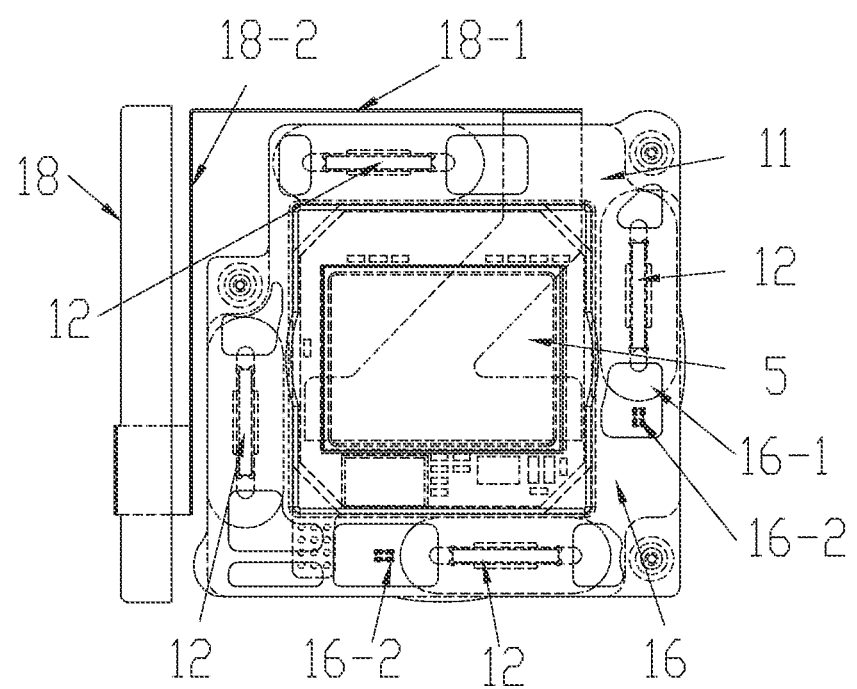
FIG. 10 is a schematic diagram illustrating assembly of a movable frame for a stabilization mechanism and a flexible substrate for the stabilization mechanism shown in FIG. 1.

In an embodiment, as shown in FIG. 10, the stabilization mechanism 10A further includes a flexible substrate 18 for the stabilization mechanism. The flexible substrate 18 for the stabilization mechanism is electrically connected to the circuit board 16 for the stabilization mechanism. A current can enter the coil 16-1 for the stabilization mechanism by the flexible substrate 18 for the stabilization mechanism, to drive the movable frame 11 for the stabilization mechanism to move along the direction X of the optical axis of the vertical lens 1 to achieve stabilization. The coil 16-1 for the stabilization mechanism and the signal lines and power lines of the camera element assembly 5 can be buried in the flexible substrate 18 for the stabilization mechanism, and arranged at the outside of the movable frame 11 for the stabilization mechanism, without interacting with the movement of the stabilization mechanism 10A.

In an embodiment, the flexible substrate 18 for the stabilization mechanism can be configured as follows: at least a curved surface A18-1 of the flexible substrate for the stabilization mechanism and a curved surface B18-2 of the flexible substrate for the stabilization mechanism are provided.

In addition, the auto-focusing mechanism 20A is further provided with a power-on flexible substrate 26 for auto-focusing connected to the flexible substrate 18 for the stabilization mechanism. The power-on flexible substrate 26 for auto-focusing is arranged at the outside of the auto-focusing mechanism 20A. The power-on flexible substrate 26 and the flexible substrate 18 for the stabilization mechanism may be integrally formed. When the flexible substrate 18 for the stabilization mechanism is equipped with a driver IC, energization for auto-focusing, servo control for feeding back a signal of the position detection component for auto-focusing, and the like can be performed.

In an embodiment, a first vibration damping gel 30 for the stabilization mechanism is provided between the stator for the stabilization mechanism and the mover for the stabilization mechanism. As shown in FIG. 1, the first vibration damping gel 30 for the stabilization mechanism is arranged at a side of the case 3 for the stabilization mechanism close to the camera element assembly 5. The base 10 for the stabilization mechanism is provided with an avoiding-hole through which the first vibration damping gel 30 for the stabilization mechanism 30 can pass. When the coil 16-1 for the stabilization mechanism is suddenly energized, the first vibration damping gel 30 has a vibration absorbing effect on the vibration generated by the camera element assembly 5, so that the stabilization mechanism 10A has a more accurate stabilization effect.

A second vibration damping gel 32 for the stabilization mechanism is provided between the mover for the stabilization mechanism and the stator for auto-focusing. As shown in FIG. 1, the second vibration damping gel 32 for the stabilization mechanism is disposed at a side surface of the movable frame 11 for the stabilization mechanism facing the auto-focusing mechanism 20A, and abuts against a side surface of the base 20 for auto-focusing facing the stabilization mechanism 10A. When the drive mechanism is impacted by the external environment or the movable frame 11 for the stabilization mechanism vibrates suddenly, the second vibration damping gel 32 for the stabilization mechanism can perform a damping effect, thereby reducing a risk of damage to the auto-focusing mechanism 20A and the stabilization mechanism 10A.

In the present invention, the components of the auto-focusing mechanism 20A and the stabilization mechanism 10A are separated and natural vibration is suppressed. Therefore, the difficulty of designing is reduced, and at the same time, it is not necessary to move the lens 1 three-dimensionally, the difficulty of designing vibration resistance when dropping is reduced, and accordingly, the centering of the lens 1 becomes easy.

An embodiment of the present invention further provides a camera device 100, including the drive mechanism described in the above embodiments, and a lens 1 and a camera element assembly 5 that are received in the drive mechanism.

Figure 11:
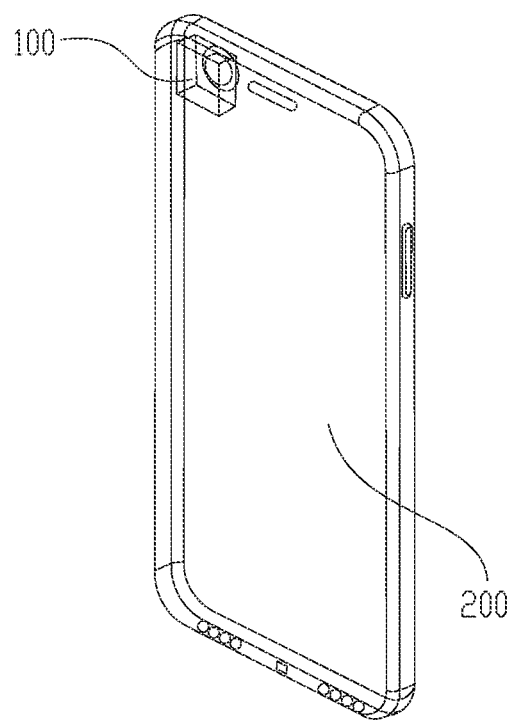
FIG. 11 is a schematic diagram illustrating a structure of a portable electric device according to an embodiment of the present invention.

An embodiment of the present invention further provides a portable electric device 200. As shown in FIG. 11, the camera device 100 including the drive mechanism described in the above embodiments can be applied to the portable electric device 200. The portable electric device 200 may be a smart phone, a feature phone, or a tablet.

However, since the lens 1 moves only along the direction X of the optical axis of the lens 1 and does not move within a plane, an opening for the lens 1 to protrude from the portable electric device 200 such as a smartphone can be minimized.

The above-described embodiments are merely preferred embodiments of the present invention and are not intended to limit the present invention. Various changes and modifications can be made to the present invention by those skilled in the art. Any modifications, equivalent substitutions and improvements made within the principle of the present invention shall fall into the protection scope of the present invention.

What is claimed is:

1. A drive mechanism, comprising:
   an auto-focusing mechanism that receives a lens and drives the lens along a direction of an optical axis of the lens, wherein the auto-focusing mechanism comprises a stator for auto-focusing and a mover for auto-focusing that is movable relative to the stator for auto-focusing, and the mover for auto-focusing comprises a holder for auto-focusing configured to install the lens; and
   a stabilization mechanism that receives a camera element assembly and drives the camera element assembly in a plane perpendicular to the direction of the optical axis of the lens, wherein the stabilization mechanism and the auto-focusing mechanism are arranged along the direction of the optical axis of the lens,
   wherein the stabilization mechanism comprises a stator for the stabilization mechanism and a mover for the stabilization mechanism that is movable relative to the stator for the stabilization mechanism and located at a side of the stator for the stabilization mechanism close to the auto-focusing mechanism, the mover for the stabilization mechanism comprises a movable frame for the stabilization mechanism spaced from the mover for auto-focusing, and the movable frame for the stabilization mechanism is configured to install the camera element assembly;
   wherein at least one groove is formed at a surface of the holder for auto-focusing facing the stator for auto-focusing, an inner side of the at least one groove is coated with a vibration damping gel for auto-focusing, the stator for auto-focusing is provided with at least one claw member extending into the at least one groove to cooperate with the vibration damping gel for auto-focusing, and the stator for auto-focusing is further provided with is at least one through-hole opposite to the at least one groove to expose the at least one groove.

2. The drive mechanism as described in claim 1, wherein the at least one groove comprises a plurality of grooves spaced from each other, and the at least one claw member comprises a plurality of claw members corresponding to the plurality of grooves.

3. The drive mechanism as described in claim 2, wherein the surface of the holder for auto-focusing where the plurality of groove is formed is perpendicular to the optical axis of the lens, and at least part of each of the plurality of claw members extends along the direction of the optical axis of the lens.

4. The drive mechanism as described in claim 3, wherein each of the plurality of claw members comprises a root of the claw member connected to a hole wall of one of the at least one through-hole and a pin of the claw member extending from the root of the claw member, the root of the claw member ha an arc shape, and the pin of the claw member has a flat plate shape extending along the direction of the optical axis of the lens.

5. The drive mechanism as described in claim 4, wherein the stator for auto-focusing comprises a case for auto-focusing, and the stator for the stabilization mechanism comprises a case for the stabilization mechanism; wherein the case for auto-focusing and the case for the stabilization mechanism cover each other to form a receiving space, and the mover for auto-focusing and the mover for the stabilization mechanism are received in the receiving space.

6. The drive mechanism as described in claim 5, wherein the case for auto-focusing comprises a top wall perpendicular to the optical axis of the lens and a light-transmitting hole formed at the top wall, and the at least one through-hole is formed at the top wall and communicated with the light-transmitting hole.

7. The drive mechanism as described in claim 6, wherein the top wall of the case for auto-focusing has a quadrangle shape, and the plurality of claw members is arranged at four corners of the top wall.

8. The drive mechanism as describe in claim 1, wherein
a first vibration damping gel for the stabilization mechanism is provided between the stator for the stabilization mechanism and the mover for the stabilization mechanism; and
a second vibration damping gel for the stabilization mechanism is provided between the mover for the stabilization mechanism and the stator for auto-focusing.

9. A camera device, comprising:
the drive mechanism as described in any one of claim 1; and
a lens and a camera element assembly that are received in the drive mechanism,
wherein the camera element assembly comprises: a filter and a circuit board that is equipped with an image sensor, the movable frame for the stabilization mechanism of the drive mechanism comprises a main body for installing the filter and a cantilever extending vertically from the main body, and the circuit board is fixed to the cantilever.

10. A portable electric device, comprising the camera device as described in claim 9.

* * * * *